United States Patent [19]

Wahls

[11] 4,058,282
[45] Nov. 15, 1977

[54] ROTATING SEAT PEDESTAL

[75] Inventor: Robert John Wahls, Spring Grove, Ill.

[73] Assignee: Freedman Seating Company, Evanston, Ill.

[21] Appl. No.: 698,417

[22] Filed: June 21, 1976

[51] Int. Cl.² ............................................. F16M 13/00
[52] U.S. Cl. .................................................... 248/418
[58] Field of Search ................ 248/408, 411, 417, 418

[56] References Cited

U.S. PATENT DOCUMENTS

| 1,743,210 | 1/1930 | Haffner | 248/411 X |
| 2,106,650 | 1/1938 | Owler | 248/418 |
| 2,334,193 | 11/1943 | Hedeen et al. | 248/418 |
| 3,758,063 | 9/1973 | Lacey | 248/411 X |
| 3,979,099 | 9/1976 | Strang | 248/418 |

FOREIGN PATENT DOCUMENTS 1,143,138  9/1957  France ................................ 248/411

Primary Examiner—William H. Schultz
Attorney, Agent, or Firm—Alter and Weiss

[57] ABSTRACT

A rotating seat pedestal has an outer tube, the wall of which has an I-shaped slot formed axially therein, telescoping over an inner tube connected to a floor base. The outer tube has brackets formed on either side of the slot, and a lever passing through the brackets has a pair of cam members mounted thereon, with one cam abutting each bracket. A sprocket is mounted on the lever intermediate the brackets. A spring-biased projection mounted transversely within the inner tube is shaped and dimensioned to protrude through the transverse portion of the slot when aligned therewith, thus indexing the seat pedestal in a forward-facing position. To lock the pedestal in a position other than forward-facing requires further turning of the lever in a first direction causing the first and second cams to pinch the brackets together thereby narrowing the slot and tightening the outer tube circumferentially onto the inner tube. The lever when rotated in a second directon loosens the outer tube and if locked in the forward-facing direction brings the sprocket into contact with the projection, forcing it inward to defeat the retaining action of the projection until the pedestal may rotate freely.

4 Claims, 6 Drawing Figures

ROTATING SEAT PEDESTAL

This invention relates generally to seats and more particularly to a seat pedestal rotatably mounted on a base column.

Rotatable seats find particular applications and uses in motor vehicles. Such seats may be utilizable in campers where seats may be faced forward for traveling, then rotated to a rear or side orientation for dining, conversation or recreation. Drivers of trucks and other commercial vehicles may find such seats convenient for locating and dispensing stock items from the rear of the truck without having to leave the seat to do so. Such seats to be effective must be designed with secure, convenient locking mechanisms whereby a desired seat orientation may be conveniently maintained. Provision should also be made to positively index the seat in its most commonly used forward facing position.

Accordingly, this invention has the following objects:

To provide rotating seat mechanisms continuously adjustable to any desired degree of rotation;

To provide such mechanisms with convenient, positively acting locking means;

To provide such locking means in simple to use lever form;

To provide such mechanisms with positive indexing means to lock the seat mechanism in a forward facing position;

To provide such mechanisms in forms whereby the anti-rotational force exerted is spread about the periphery of the seat base; and To provide such indexing means with positive spring-biased, self-actuating operation.

These and further objects will become more apparent upon consideration of the accompanying drawings in which.

Figure 1:
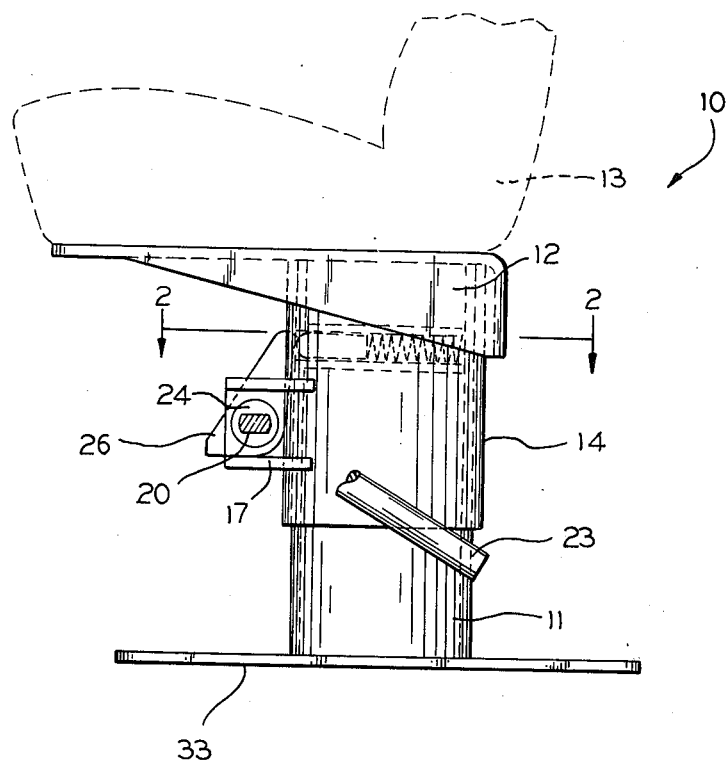
FIG. 1 is a side view of the rotating seat pedestal with part of the control lever broken away.

Consistent with the foregoing objects, applicant herein provides a seat pedestal structure 10 mounted to floor plate 33, having rotatably associated telescoping members 11 and 14 supporting seat pedestal 12, with the exterior one of said telescoping members having slot means 16 formed therethrough. Brackets 17, mounted with slot means 16 therebetween, rotatably support control rod means 19 with cam means 24 mounted thereon, said cam means positioned to abut said brackets 17. When control rod means 19 is rotated, cam means 24 draw brackets 17 toward one another, thereby narrowing slot means 16 and circumferentially compressing said exterior member 14 onto interior member 12, thereby preventing further rotation of said members relative to each other. Indexing means 29 is positioned to engage peripheral slot portion 32 of slot means 16, thereby positively indexing said exterior member 14 in a preselected attitude of rotation with said interior member 11. Indexing means 29 is defeatable by sprocket 26, mounted on control rod means 19, whereby any desired attitude of rotation may be selected.

Referring now to FIG. 1, numeral 10 indicates generally a rotating seat pedestal supported on tubular floor column 11 attached to floor plate 33. A seat base 12 has seat 13, indicated in phantom, mounted thereon and is itself mounted to pedestal tube or column 14. Pedestal column 14 may be rotatably telescopically mounted to tubular floor column 11 by any conventional means such as ball bearings or the like, thus allowing slot base 12 to swivel freely.

Figure 3:
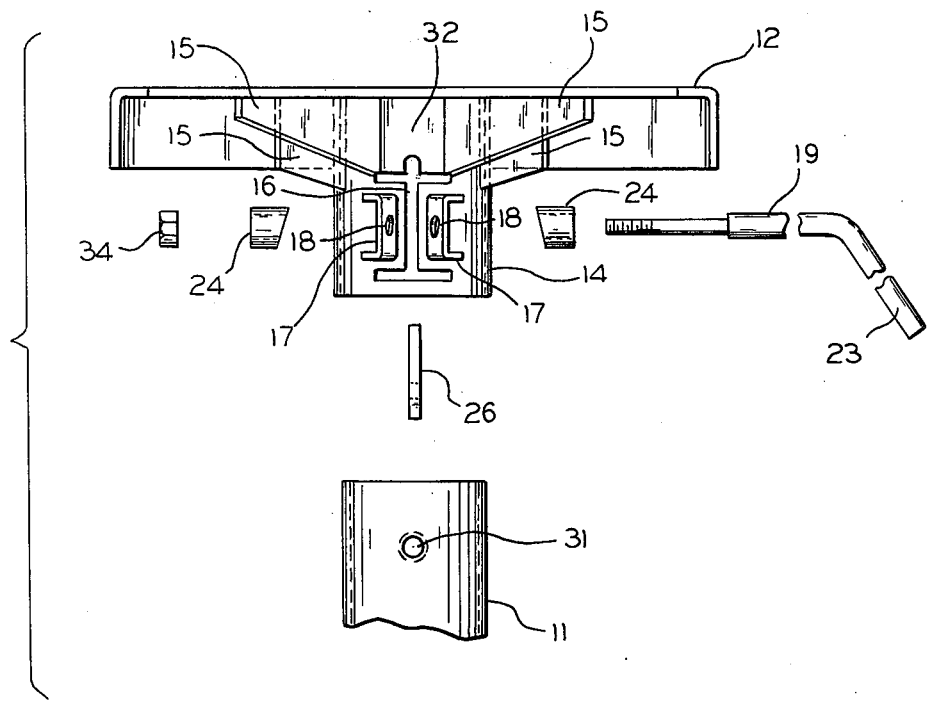
FIG. 3 is a front exploded view of the seat mechanism.
Figure 6:
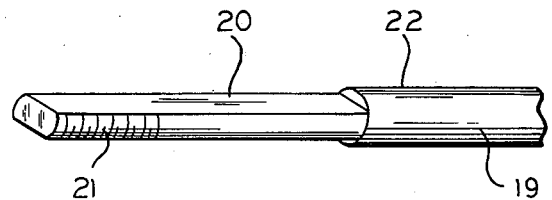
FIG. 6 is a partial perspective view of the control lever.

As illustrated in FIG. 3, seat base 12 is secured to pedestal column 14 by brace members 15 and has formed therein a characterized slot such as I-shaped slot 16. Cam brackets 17 are attached to pedestal column 14 and are disposed on either side of the vertical portion of slot 16. Each cam bracket 17 has rod aperture 18 formed therethrough, aligned to insertingly and rotatingly accommodate control rod 19. As illustrated in FIG. 6, control rod 19 comprises an indexing portion such as flattened tongue portion 20 with screw threads 21 formed thereon and a rounded portion 22 terminating in a handle 23.

Figure 4:
FIG. 4 is a perspective view of a cam member.
Figure 5:
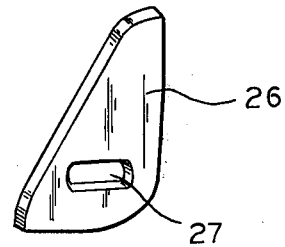
FIG. 5 is a perspective view of the sprocket.

Cam members 24 as illustrated in FIG. 4 have slots 25 formed axially therethrough, shaped and dimensioned to closely fit flattened tongue portion 20 of control lever 21. Similarly, sprocket 26 as illustrated in FIG. 5, has slot 27 formed therethrough also shaped to accommodate tongue portion 20.

Figure 2:
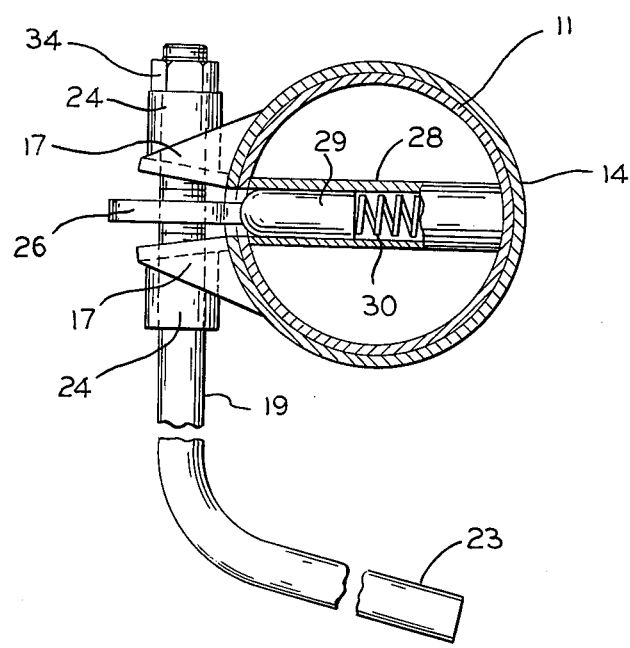
FIG. 2 is a view along the telescoping tubes of the rotating seat pedestal of FIG. 1 taken along line 2—2.

When fully assembled as illustrated in FIG. 2, tongue portion 20 is inserted through bracket apertures 18 with a cam member 24 abutting the outer surface of each bracket 17 and with sprocket 26 positioned on tongue portion 20 intermediate brackets 18. Cam members 24 and sprocket 26 are thus positively indexed on control lever 19 and will rotate as control lever 19 is rotated. Lock nut 34 is threaded onto threads 20 to secure the locking mechanism.

As illustrated in FIG. 2, tubular floor column 11 has formed transversely therethrough channel 28 into which are inserted stop 29 and spring-bias means 30. Thus assembled, spring 30 urges stop 29 outward through aperture 31 of column 11. Aperture 31 is preferably positioned to align with the rounded peripheral portion 32 of I-shaped slot 16 and stop 29 is shaped and dimensioned to protrude through peripheral portion 32. In this manner, seat pedestal 12 may be positively indexed in one position, most commonly the forward facing position. Sprocket 26 is shaped and dimensioned to contact stop 29 when control lever 22 is lowered, i.e., turned clockwise.

Thus, to rotate seat pedestal 12 from a positively indexed position to an intermediate position, handle 23 of control lever 19 is depressed, thereby bringing sprocket 26 into contact with stop 29, forcing stop 29 into channel 28. When stop 29 has been moved a sufficient distance into channel 28 and is no longer protruding through rounded portion 32 of I-shaped slot 16, outer column 14 may then be rotated slightly to a position where, when control lever 22 is raised, stop 29 will contact the inner wall of pedestal column 14. Pedestal column 14 may then be freely rotated. A plurality of such stops may be provided to index seat pedestal 12 in more than one position, as desired or required.

To lock pedestal column 14 in an intermediate position, handle 22 of control lever 19 is elevated (i.e., turned counterclockwise), rotating cam elements 24 to urge brackets 18 toward each other, thereby narrowing the vertical portion of slot 16 and compressibly tightening pedestal column 14 circumferentially about the outer circumference of tubular base column 11. The force required to prevent rotation of seat pedestal 12 is thus distributed about the circumferential periphery of floor column 11, rather than being concentrated at a single point.

In this manner, seat 13 may be selectively rotated to any position within a 360° arc of rotation. To quickly index seat 13 in a forward facing position control lever handle 23 may be depressed to release pedestal column 14 from base column 11 and thereafter seat 13 may be rotated until slot portion 32 aligns with apertures 31, and spring 30 urges stop 29 therethrough. Handle 23 may then be raised to firmly hold seat pedestal 12 in place. In this manner, control rod 19 functions to secure seat pedestal 12 in a desired attitude of rotation and also functions to selectively defeat stop 29 as well, thus providing a convenient, single control for all seat pedestal rotation functions.

Control lever handle 23 has herein been illustrated as extending rearward from control rod 19; it should be understood, however, that said control lever 23 may be oriented to extend in a forward direction as well, as the exigencies of vehicle design and space limitations dictate. In any attitude of installation, moving control lever handle 23 in one direction locks the pedestal in place, while moving it in the other direction operates cam 26 to defeat sprocket 29.

While the foregoing has presented a particular embodiment of the invention, it is to be understood that this embodiment is presented by way of example only and is not intended to limit the scope of the invention. It is anticipated that others skilled in the art will perceive of variations which, while differing from the foregoing, do not depart from the spirit and scope of the invention.

I claim:

1. In a rotatable seat structure having a pair of tubular telescoping members, with the first of said tubular members mounted to the floor of a vehicle, a seat mounted on the second of said tubular members, compression means to selectively maintain said members in a desired attitude of rotation, said compression means including slot means formed in said exterior member, and indexing means in register with said slot means to positively align said tubular members in at least one preselected attitude of rotation, the improvement comprising:
   single control lever means,
   said control means mounted on said exterior member
      said control means being rotatable and comprising means for defeating said indexing means when rotated in first direction and means for engaging said compression means when rotated in a second direction.

2. The apparatus as recited in claim 1 wherein said control lever means further includes sprocket means,
   said sprocket means being positioned on said control lever means in register with said slot means, to engage and defeat said indexing means when said control lever means is rotated in said first direction.

3. A rotatable seat structure mountable on a floor surface, comprising:
   a pair of tubular telescoping members,
   the first of said members having seat pedestal means mounted thereon,
   the second of said tube members being mounted to said floor,
   one of said tubular members mounted exterior to the other when said tubular members are telescopically associated,
   said exterior member having slot means formed axially partially therethrough;
   a pair of brackets,
   said brackets being oppositely disposed proximate said slot means with said slot means positioned therebetween;
   single control rod means,
   said single control rod means rotatably associated with said brackets;
   compression means,
   said compression means abutting said brackets whereby rotation of said control means compressively draws said brackets towards each other thereby narrowing said slot means to compressibly maintain said exterior member against said interior member in a desired attitude of rotation;
   at least one spring biased indexing member,
   said indexing member positioned within said interior member,
   said exterior member having index aperture means formed therethrough registrable with said indexing member, and
   sprocket means,
   said sprocket means being mounted on said single control rod means in register with said slot means and said index aperture means,
   said sprocket means engaging and defeating said index means when said single control rod means is operated in a first direction,
   said single control rod means engaging said compression means when said single control rod means is operated in a second direction.

4. The apparatus as recited in claim 3 wherein said index aperture means is formed as an integral extension of said slot means.

* * * * *